May 13, 1952 — E. L. CALLAHAN — 2,596,468
TRANSIT
Filed May 5, 1947 — 3 Sheets-Sheet 1

INVENTOR.
EZRA LEO CALLAHAN
BY Westall & Westall
ATTORNEYS

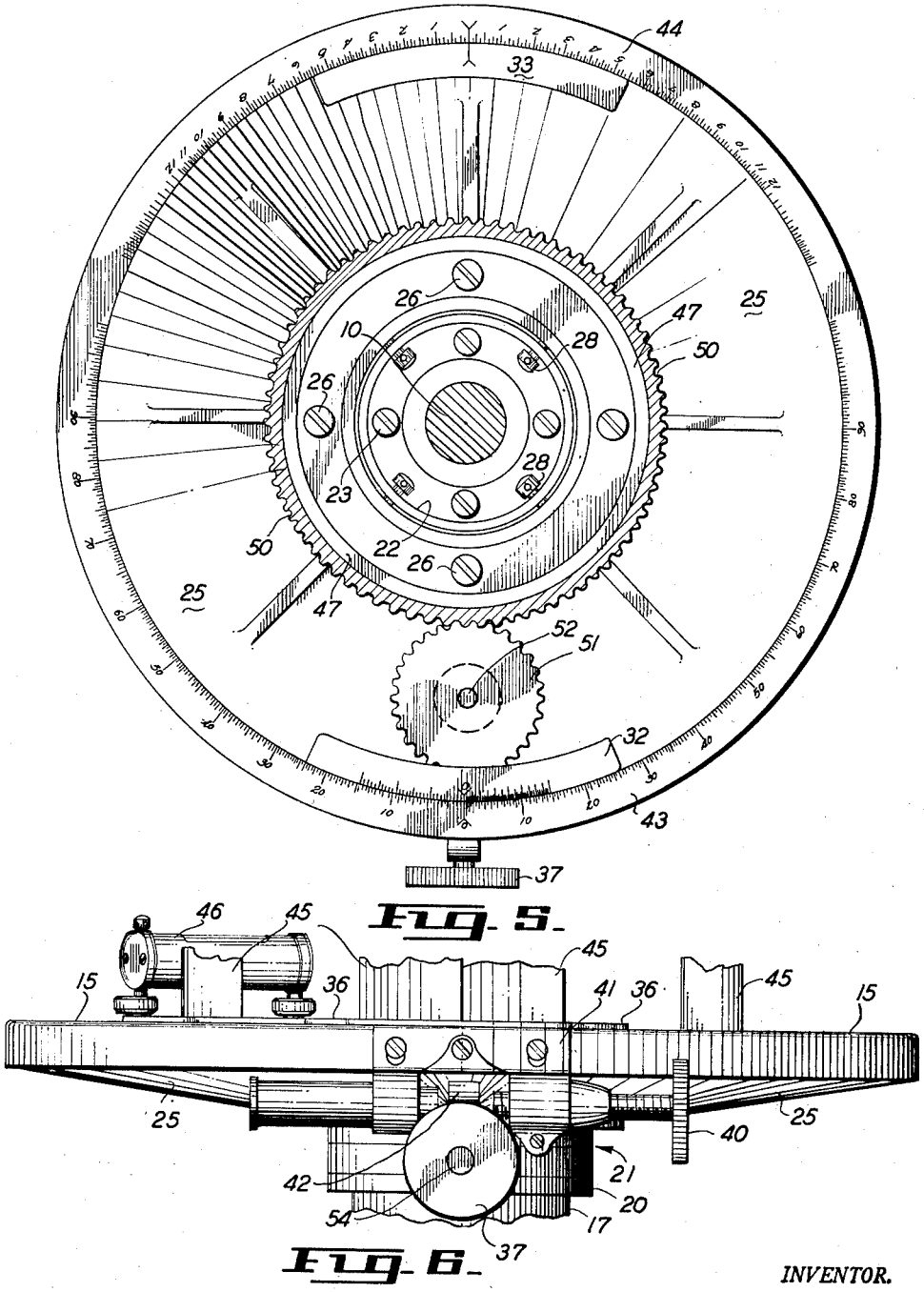

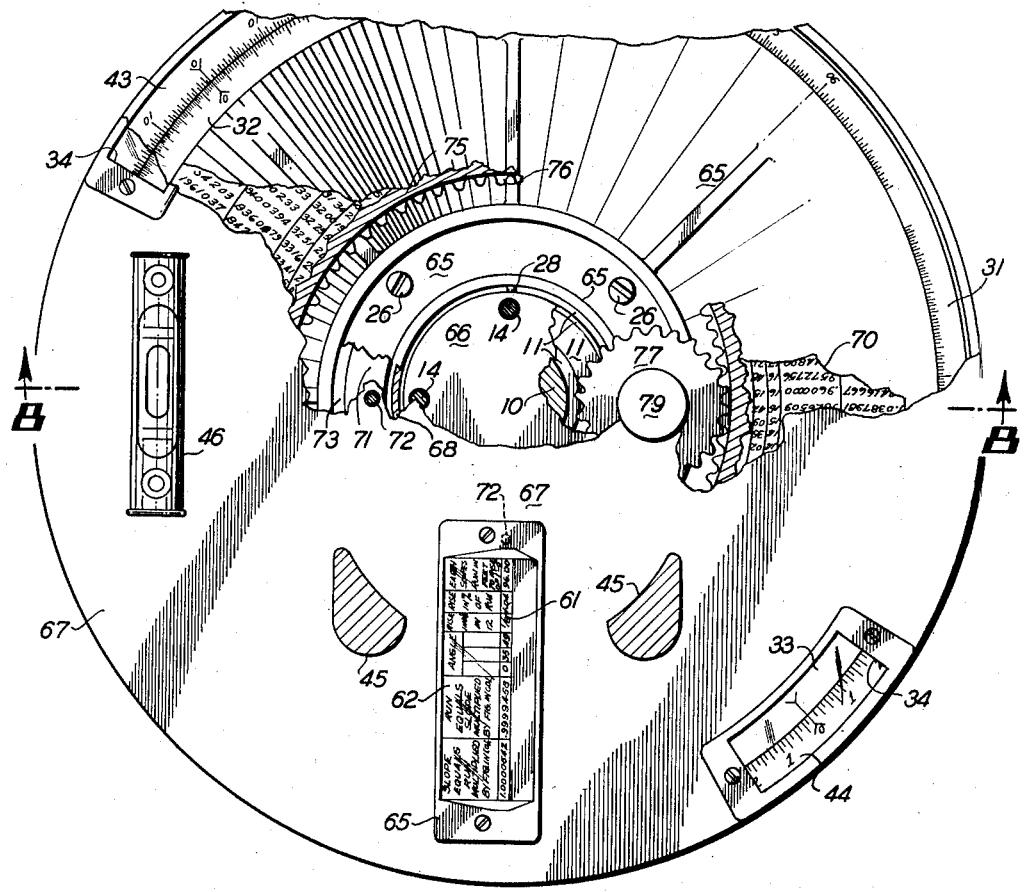
Fig. 7
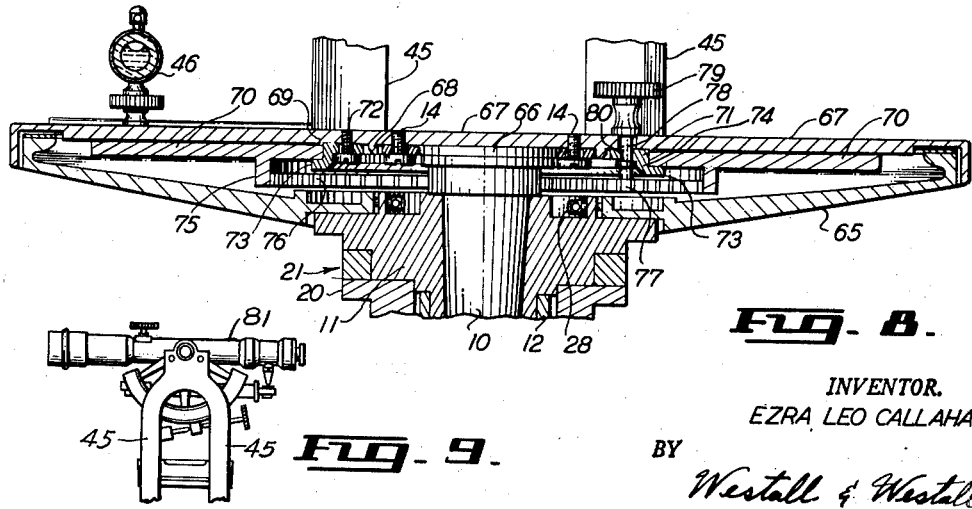
Fig. 8
Fig. 9
INVENTOR.
EZRA LEO CALLAHAN
BY
Westall & Westall
ATTORNEYS Patented May 13, 1952

2,596,468

UNITED STATES PATENT OFFICE 2,596,468

TRANSIT

Ezra Leo Callahan, Inglewood, Calif.

Application May 5, 1947, Serial No. 746,105

5 Claims. (Cl. 33—46)

This invention relates to transits, and more specifically contemplates transit mechanism embodying an indicator bearing conversion tables for determining, for any horizontal or vertical angle to which the transit is adjusted, various additional information required for effective use of such instruments.

The laying out of proposed work in the field with the aid of transits is well understood by those engaged in the art, and is ordinarily initiated by the ascertainment of the angle between the line of the proposed work and a predetermined plane. However, the distances between points along the sides of the angle, some of which may be inaccessible, the rise or distance between the sides of the angle per unit of measurement along either of the sides of the angle, the rise in percentage of the run or of one side of the angle, and the distance between pre-determined points per unit of measurement of the rise, must all be calculated, which in most instances is a time-consuming operation with the ever-present possibility of error.

It is a principal object of the present invention to provide a device adapted for embodiment in a novel and convenient manner in conventional transits whereby the user may, with relative celerity and assured accuracy, determine at any angle to which the transit is adjusted the length of either side of the angle with the lengths of the other side known and, coincidentally, the rise or equivalent lateral distance in percentage of the run as well as per unit of measurement of the run and the proportionate length of one side of the angle relative to the length of the rise and, conversely, indicate without calculation the angle of the work to be constructed relative to a predetermined plane, as for example the vertical or horizontal plane, from any of the above-indicated factors so as to expedite the use of the transit and the laying out of work by minimizing in the field the more complex calculations normally incident thereto.

Another object is the provision of a transit incorporating a rotatable disk, completely enclosed within the transit, and bearing concentrically-arranged circular tables of the type above alluded to, corresponding to numerous different angles, in combination with a view opening by which complementary data of the several tables may be isolated so as to obviate errors in reading the pertinent figures and expedite their identification.

More specifically, an object hereof is to provide a transit embodying a horizontal limb and overlying vernier plate, relatively rotatable with respect to one another and to the tripod or other supporting mechanism therefor, in combination with an independently-rotatable annular indicia plate carrying the tables of corresponding data registerable with a view opening through the vernier plate adjacent the window through which the degree calibrations carried by the horizontal limb and the vernier therefor may be viewed, in response to manual rotation of the indicia plate through a control located below the horizontal limb whereby the data pertinent to any particular angle is conveniently ascertainable coincidentally with the adjustment of the horizontal limb and determination of the angle sought.

Still another object is the provision of a transit embodying a horizontal limb carrying a degree scale upon one-half of its circumference in any conventional arrangement and a complementary scale upon the other half of its circumference indicating the rise in twelve inches of one side of a vertical angle corresponding in degree with the horizontal angle indicated by any specific adjustment of the horizontal limb, in combination with verniers, suspended from the underside of a vernier plate superimposed thereon, for each scale.

Another object is to provide a transit incorporating an indicia plate, carrying tables of pertinent information, rotatably suspended from the vernier plate, in combination with a manual control located above the vernier plate by which the indicia plate may be actuated to register any of the figures of the tables with a viewing aperture in the vernier plate, and permit coincident rotation of the indicia and vernier plates during use of the transit in a conventional manner, thereby assuring preservation of the adjustment of the indicia plate during subsequent rotative adjustment of the vernier plate and horizontal limb, and thus obviating the necessity for subsequent manipulation of the indicia plate which might otherwise disturb critical pre-adjustment between the vernier plate and horizontal limb.

Other objects and salient advantages of my invention, as for example simplicity of construction, facility in use, utility of the transit by persons unfamiliar with the method of mathematical conversion of the limited information obtainable from conventional transits, as well as greater accuracy and speed in obtaining the results sought, will appear to those of skill in the art from an examination of the following description read in the light of the accompanying drawings, in which:

Fig. 5 is a plan view of the horizontal limb showing in section the gear ring depending from the integral indicia plate thereabove;

Fig. 6 is an elevation of the horizontal limb assembly depicting the tangent adjusting screw mechanism and the vernier plate clamping screw;

Fig. 7 is a horizontal section through the standard of a transit embodying a modified form of my invention, with the vernier and indicia plates broken away;

Fig. 8 is a vertical section on line 8—8 of Fig. 7.

Fig. 9 is a broken elevation of the upper part of the transit, showing the telescope in elevation.

Figure 1:
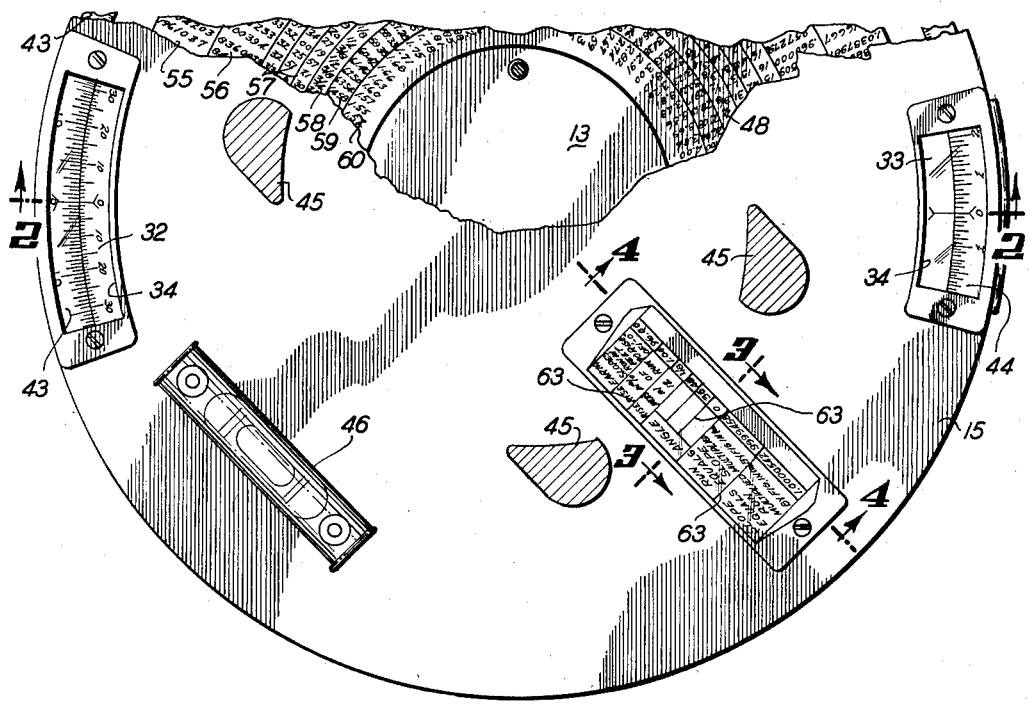
Fig. 1 is a sectional view through the standard of a transit embodying my invention, showing in plan the vernier plate which is partially broken away to expose indicia plate and the conversion tables thereon.

Referring to the drawings in detail, the numerals of which indicate similar parts throughout the several views, 10 designates a vertically-disposed, tapered, inner-center spindle which, in accordance with conventional construction, is journalled within the tapered bore of outer center 11. The outer center is in turn independently rotatable within a levelling head, the upper end of which is indicated at 12. The upper end of the inner center 10 is circularly flanged as at 13, and formed with a flat upper surface to which is attached by screws 14 or the like a vernier plate 15 equipped with an annular rim 16 depending from the periphery thereof. The upper end of the outer center 11 is diametrically enlarged as at 17 to form a downwardly-directed shoulder 18 against which is fitted an encircling clamp collar 19 having a flange 20 adjacent its upper end for the support of the circular portion of a vernier plate clamp 21 adapted to frictionally engage the enlarged upper end of outer center 11 in response to actuation of means hereinafter described. The upper surface of the outer center 11 is annularly grooved as at 22 to accommodate screws 23 threaded through the diametric enlargement 17 of the outer center 11 and into the clamp collar 19 to maintain the position of clamp 21. The marginal edge of the diametric enlargement 17 of the outer center 11 is cut away, as at 24, to form a flat surface upon which the inner edge of an annular horizontal limb 25 is adapted to be secured by screws 26. The holes 27 in the edge of limb 25 through which screws 26 extend are considerably greater in diameter than the diameters of the screw shanks to permit a measure of lateral adjustment of the horizontal limb 25 with respect to the axis of the inner center spindle 10. With screws 26 loosened, this adjustment is effected by a series of adjusting screws 28 threaded radially through an upstanding wall 29 comprising the outer side of the annular groove 22 in which the heads of screws 23 are accommodated. The screws 28 are adapted to bear against the bore of horizontal limb 25 so as to shift the same laterally in accordance with their adjustment, whereupon the clamping screws 26 are tightened down to fix the limb in rigid relationship with the outer center 11.

The horizontal limb 25 is inclined upwardly toward its outer edge, and is of an outside diameter slightly less than that of the rim 16, depending from the vernier plate 15, by which it is encompassed, whereby the rim 16 substantially encloses the space between the vernier plate and the horizontal limb. The horizontal limb 25 is formed with a peripheral lip 30 having a flat upwardly-directed surface movable in close proximity to the underside of vernier plate 15 in response to relative rotation between the inner and outer centers 10 and 11. An annular scale plate 31, bearing scales of degrees and of corresponding rise in 12" as is hereinafter more specifically described, is secured by suitable means to the upper surface of lip 30 of the horizontal limb 25. In the same horizontal plane as, and adjacent to, the scale plate 31, an arcuate vernier 32 and an index plate 33 are secured to the underside of vernier plate 15 in diametric opposition to one another for registry with the degree scale and rise in twelve inch scale, respectively, above alluded to. The vernier 32 and index plate 33 and the scale plate 31 of the horizontal limb 25 are visible through openings 34 formed in vernier plate 15 above the vernier 32 and index plate 33. The openings 34 are covered by glass panes 35 secured to plate 15 by suitable frames generally indicated at 36.

Figure 2:
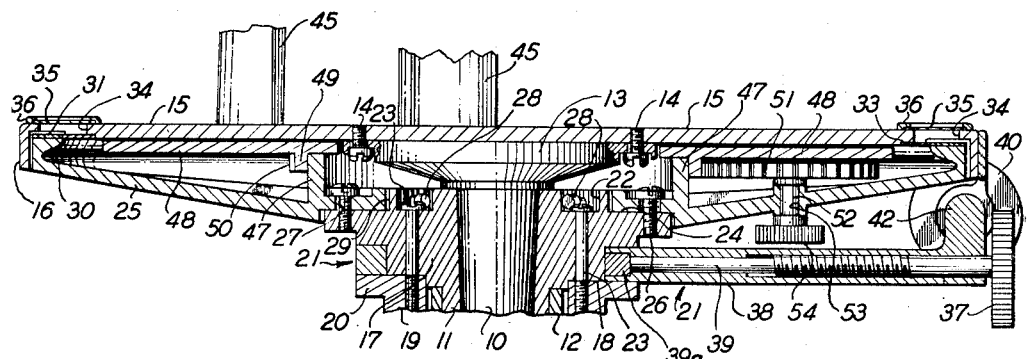
Fig. 2 is a vertical section taken on line 2—2 of Fig. 1 through the horizontal limb assembly and associated parts, depicting particularly the means by which the indicia plate is rotated.

Vernier plate 15 and horizontal limb 25, normally rotatable with respect to one another, are adapted to be locked against relative rotation by a dual clamping screw mechanism comprising a vernier plate clamping screw 37, threaded longitudinally into a radial extension 38 of the vernier plate clamp 21 which encircles outer center 11. A plunger rod 39, disposed in the bore of the radial extension 38 of clamp 21 is moved longitudinally inward in response to corresponding pressure of the vernier clamping screw 37, so as to force a gib 39a into frictional engagement with the outer center. Forming a part of the clamping screw assembly is a tangent screw 40 (Figs. 2 and 6) threaded through a suitable bracket 41 secured to the depending rim 16 of the vernier plate 15. The tangent screw 40 is adapted to bear against one side of an upward projection 42, integral with the radial extension 38 of the clamp 21, the other side of the projection being engaged by a spring-pressed plunger, whereby, upon release of the gib from locking engagement with the outer center 11 in response to the actuation of screw 37, the vernier plate 15 may be rotated relative to the horizontal limb 25 in either direction, and thereafter critically adjusted by rotative manipulation of tangent screw 40. The gib 39a is then forced against the outer center to fix the relationship of the vernier plate and horizontal limb.

The annular scale plate 31 secured to the upper surface of the lip 30 of the horizontal limb 25 bears two scales diametrically-opposed to one another. One scale 43 is calibrated in degrees marked off in two quadrants in accordance with conventional practice. The opposite scale 44 is calibrated in terms of rise or divergence in twelve inches of one side of an angle from the opposite side thereof, and is coordinated with the degree scale 43 whereby the rise of twelve inches corresponding to any angle indicated on scale 43, as determined by its vernier 32, may be coincidentally ascertained by viewing scale 44 and its index plate 33 through one of openings 34 in vernier plate 15.

Superimposed upon vernier plate 15 is a standard comprising four legs 45 for the support of the vertical circle, telescope 81 and associated parts common to conventional transits. It will be understood that all parts of the transit embodying my invention not specifically illustrated or herein described conform in structure, design, function and utility with transits of the prior art. 46 indicates a conventional level assembly mounted upon the upper surface of vernier plate 15.

Integral with horizontal limb 25 is an upstanding circular wall 47 of a diameter only slightly greater than that of the diametric enlargement 17 of the outer center 11 to which the limb is attached. The wall 47 provides a bearing for an annular indicia plate 48 interposed between horizontal limb 25 and vernier plate 15. The indicia plate 48 is of an inside diameter slightly less than that of wall 47 so as to bear upon the upper end of the latter and be supported thereby. Integral with plate 48 is a downwardly-directed annular retainer 49 adapted to closely encompass the wall 47 and thereby maintain the parallel relationship between the upper surface of indicia plate 48 and the vernier plate 15. The outer surface of the retainer 49 is toothed to form a gear ring 50 which is continuously engaged by a drive gear 51 mounted upon the upper end of a short shaft 52 extending downwardly through and journalled in a suitable bearing 53 in horizontal limb 25. The lower end of shaft 52 terminates below horizontal limb 25 and is provided with a knurled disk 54 by which the drive gear 51 may be rotated in either direction to transmit, through the gear ring 50, rotative impetus in the opposite direction to the indicia plate 48.

The outside diameter of indicia plate 48 is, in the present embodiment, slightly less than the distance between the verniers 32 and 33 through the axis of the assembly, and the upper surface of plate 48 is, as hereinabove indicated, flat, and is rotated closely adjacent and parallel to the undersurface of vernier plate 15. The surface of plate 48 is divided by a series of concentric circles into a plurality of annular areas in which are marked circular columns of figures representing different tables of data required for effective use of the information obtained incident to the relative adjustment of the vernier plate 15 and horizontal limb 25.

In the outermost annulus 55 a series of multipliers for a multiplicand corresponding to different runs or lengths of one side of any of a plurality of angles are delineated, by which the slopes or lengths of the other sides of such angles may be determined. In the next annulus 56 a series of multipliers for multiplicands representing different slopes or lengths of corresponding sides of different angles are marked, whereby the run or lengths of other sides of particular angles may be ascertained. Thus with either the run or slope known, the length of one side of an angle of predetermined degree may be quickly and easily determined with accuracy by the simple multiplication of the known factor by the multiplier given. The particular angles with which the figures in the outer two annuli are coordinated are indicated in the next three narrow annuli 57 of the plate in degrees, minutes and seconds, respectively. In the next inner annulus 58 a table of figures indicating the rise in inches and fractions thereof in twelve inches of the run or length of one side of each of the angles indicated in the annulus 57, is marked. In the next annular column 59 is listed a series of figures, each representing for the different angles of annulus 57 the rise in terms of percentage of the run or length of one side of the angle. In the innermost annulus 60 a scale of earth slopes, i. e., figures indicating the run (or length of one side of an angle) in feet per a rise of one foot for each of the angles noted in corresponding transversely aligned sections of the degree table in annuli 57, are marked, the other side of the angle being represented by a horizontal plane. It will be understood that all transversely-aligned figures in the respective annuli 55—60 of the several tables are coordinated so that all information carried by indicia plate 48 is instantly and conveniently available for any angle indicated.

Figure 3:
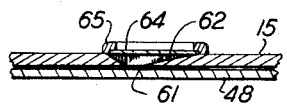
Figs. 3 and 4 are sectional views taken on correspondingly-numbered lines of Fig. 1, and showing the recessed surface upon which the legend designations of the various conversion tables are delineated and the opening through the vernier plate through which the tables may be viewed.
Figure 4:

In order to enable the reading of the tables and facilitate identification of any set of figures which may be pertinent to a particular problem, I provide a slot 61 (Fig. 3) radially disposed in the vernier plate 15 of a length substantially equal to the distance between the inner and outer edges of indicia plate 48 and of a width only slightly greater than the height of the individual figures carried by the plate. Slot 61 is located directly over plate 48 so as to permit registry of any set of radially aligned figures of the respective scales therewith. The surface of plate 15 adjoining one side of slot 61 is beveled gradually to form an inclined area 62 divided by lines 63 in a manner coinciding with the concentric divisions of plate 48, each division of the inclined surface 62 bearing a legend identifying the annular columns of figures carried by plate 48 in alignment therewith. The legends are protected, and the interior of the chamber, defined by the vernier plate and horizontal limb, is sealed by a glass pane 64 secured over slot 61 and the inclined area 62 by a frame 65.

The use and operation of a transit embodying my invention is best described and more easily appreciated by examples of applications of the device to particular problems commonly encountered. Assume, for example, that a line leading from a point A to an inaccessible point B is located and the distance between these points is known, it being required to set a point C lying at the point of intersection of a line, forming an angle with the base line AB, and a line perpendicular to the base line. By the conventional use of the transit, the angle between the lines AB and AC may be determined and this angle may be located in the table of figures contained in the annuli 57 delineated on the indicia plate 48, incident to merely rotating the indicia plate through corresponding movement of the disk handle 54 so as to register the figures indicating that angle with the slot in vernier plate 15. If, however, the point C to be set is known to lie upon a line representing a particular rise in twelve inches with respect to the base line AB, the use of the conventional transit mechanism to determine the angle is obviated, it being merely necessary to locate the particular rise in twelve inches in the table of annulus 58 of indicia plate 48 whereupon the angle, if it is desired for any purpose, will be given in the transversely aligned section of the annuli 57. The distance between the points A and C may then be easily determined by multiplying the run or distance between the points A and B by the multiplier found in the complementary transversely-aligned section of the outermost annulus 55. The transit placed at point A may thereupon be adjusted to sight along the line AC as indicated on the horizontal limb by either the scale of rise in twelve inches or the degree scale carried by the limb. The point C is set on this line of sight a distance from point A obtained by the above simple calculation.

The use of the transit and other tables carried by the indicia plate and the relationship of the latter with respect to the scales delineated upon the horizontal limb and vertical circle will be understood from the foregoing description without specific example. It will be appreciated that the disposition of the indicia plate in a horizontal plane adjacent the vernier plate and horizontal limb is highly important as an aid in effecting the various conversions of known factors in any particular problem.

In Figs. 7 and 8 I have illustrated a modified form, which for many utilities represents a preferred embodiment of my invention. In this construction the relationship of the inner and outer centers 10 and 11, the form of the latter and of the vernier plate clamping screw and tangent screw assemblies, are substantially the same as in the embodiment hereof first described. The horizontal limb 65, which is also similar in construction to limb 25, is secured to the upper marginal edge of the outer center 11 by screws 26. With screws 26 loosened, the horizontal limb 65 may be critically positioned to assure perfect coaxial relationship with the inner and outer centers 10 and 11 by screws 28, as hereinabove described with reference to the form of my invention shown in Figs. 1 to 6, inclusive.

The upper end of the inner center 10 is diametrically enlarged as at 66 for the attachment of a vernier plate 67 in coaxial relationship therewith by screws 14. The holes in the enlargement of the inner center 10 for the projection of screws 14 are larger than the shanks of said screws to permit the vernier plate 67 to be critically balanced. Assembly of vernier plate 67 upon the top of the inner center 10 is facilitated by the provision of an annular wall 68 of a diameter slightly greater than that of the enlarged upper end 66 of the inner center 10 so as to encompass the latter.

An annular bearing rim 69 of a diameter greater than that of wall 68 depends from the undersurface of vernier plate 67 against which the inner marginal edge of an indicia plate 70 is held by an annular retainer 71, secured to the underside of the vernier plate 67 by screws 72. Retainer 71 is formed with a bearing flange 73 which is suspended below the rim 69 of vernier plate 67 by an intermediate depending hub 74 of the retainer, but is spaced from the rim 69 a distance substantially equal to the thickness of indicia plate 70. Thus the indicia plate is frictionally retained between rim 69 and bearing flange 73 of the vernier plate and retainer 71, in close proximity to the underside of vernier plate 67. Lateral movement of the indicia plate 70 is resisted by the snug engagement of hub 74 of the retainer 71 with the bore of the plate 70. It will be understood that while the inner edge of the indicia plate is closely engaged by the retainer 71 and depending rim 69 of the vernier plate, it is free to rotate, the friction imposed being only sufficient to facilitate control of its rotation relative to the vernier plate.

Depending from and integral with the underside of the indicia plate is an annular ring 75, the inner surface of which is formed with teeth to provide a gear ring 76 with which the teeth of a pinion 77 are in mesh. Pinion 77 is carried on the lower end of a short shaft 78 extending upwardly through the retainer 71 and vernier plate 67. The holes through which shaft 78 extends are of sufficient diameter to permit the preliminary critical lateral adjustment of the vernier plate above referred to. Above the vernier plate the shaft 78 is equipped with a knurled knob 79 to enable manual rotation of the shaft and pinion 77 so as to impart corresponding movement to the indicia plate 70. The shaft 78 is held against axial movement relative to the vernier plate 67 by the engagement of the upper surface of plate 67 and the undersurface of the retainer 71 by the knob 79 and a collar 80, respectively, the latter being integral with shaft 78.

The annular columns of figures inscribed or otherwise delineated upon the indicia plate 70 are identical to those of the embodiment first described and accordingly need not again be explained. It will suffice to point out that the figures are visible through a radial slot 61 in vernier plate 67, located at the opposite side of the radius passing through the index plate 33, with which the rise-in-twelve-inch scale 44 is read, from knob 79. Thus the user of the transit, standing in back of the window 34, through which scale 44 is visible, may, without changing his position, also view the figures on the indicia plate 70, moved beneath the slot in response to the rotation of knob 79, which is also conveniently accessible from this position. Another important feature of this embodiment of the invention resides in the relationship of the parts that assures movement of indicia plate 70 with vernier plate 67 when the latter is rotatably adjusted in accordance with conventional utility of the transit, so as to enable the pre-adjustment of the indicia plate 70 and obviate disturbance of such adjustment incident to subsequent relative manipulation of the vernier plate and horizontal limb 65.

The utility of the embodiments of Figs. 7 and 8 is substantially the same as explained with reference to Figs. 1 to 6, inclusive, except with regard to those details of the mechanical operation that are due to the structural distinctions between these embodiments immediately above described.

It will be appreciated that many changes may be made in the specific embodiment illustrated within the purview of my invention, and more particularly in design, shape and proportion of the parts, that other conventional types of transits may be modified to incorporate the novel features hereof, that other well-known expedients for effecting the rotation of the indicia plate relative to the vernier plate may be substituted for the gear and ring assembly, that ball bearings may be interposed between the indicia plate and and the vernier plate or horizontal limb, that the slot 61 in the vernier plate for viewing the figures carried by the indicia plate may be located on any radius of the vernier plate, the inclined surface 62 may be disposed at the opposite side of slot 61 if desired, and the legends inverted—all without departing from the spirit of my invention as defined in the appended claims.

What I claim and desire to secure by Letters Patent is:

1. In a transit, a telescope, means to rotatably mount said telescope, a spindle, a horizontal limb encircling said spindle and rotatable relative to said means, the marginal edge of said limb bearing a degree scale, a plate encircling said spindle and rotatable with respect to said horizontal limb bearing conversion tables comprising figures coordinated with the degree calibrations of said degree scale and visible from above said horizontal limb, and means comprising a knob disposed for manual actuation to rotate said plate relative to said horizontal limb and independently of the adjustment of the telescope.

2. In a transit, a telescope, an inner center and an outer center coaxially aligned and relatively rotatable, a horizontal limb secured to said outer center, a vernier plate above said horizontal limb and secured to said inner center to support said telescope for rotary adjustment of the latter relative to said limb, said horizontal limb bearing a degree scale on its marginal edge, a vernier carried by said vernier plate in close proximity to said degree scale, means to rotate said inner and outer centers relative to one another so as to move said degree scale relative to said vernier, an indicia plate disposed between said vernier plate and horizontal limb and bearing conversion tables comprising figures coordinated with the degree calibrations of said degree scale, and means comprising gear mechanism and a member disposed exteriorly of the space between said vernier plate and said limb engageable with said indicia plate to independently rotate the latter relative to said vernier plate and horizontal limb while maintaining the adjusted position of the telescope, said vernier plate being formed with a slot therein for viewing the tables carried by said indicia plate.

3. In a transit, a telescope, an inner center and an outer center coaxially aligned and relatively rotatable, a horizontal limb secured to said outer center, a vernier plate above said horizontal limb and secured to said inner center, means carried by said vernier plate for the movable support of said telescope, said horizontal limb bearing a degree scale on its marginal edge, a vernier carried by said vernier plate in close proximity to said degree scale, means to rotate said inner and outer centers relative to one another so as to move said degree scale relative to said vernier, an indicia plate disposed between said vernier plate and horizontal limb and bearing conversion tables comprising figures coordinated with the degree calibrations of said degree scale, gear mechanism engageable with said indicia plate to rotate the latter relative to said vernier plate and horizontal limb, and means comprising a knob disposed exteriorly of the chamber formed between said vernier plate and horizontal limb to actuate said gear mechanism independently of the movement of the telescope whereby the telescope and indicia plate may be adjusted sequentially, said vernier plate being formed with an opening through which the tables carried by said indicia plate may be viewed.

4. In a transit comprising a vertically adjustable telescope, an inner center, an outer center encircling said inner center, a circular horizontal limb carried by said outer center, a vernier plate carried by said inner center above said horizontal limb, the upper marginal edge of said horizontal limb bearing a degree scale, a vernier suspended from said vernier plate in the plane of and in close proximity to said degree scale for reading the latter, a peripheral rim depending from said vernier plate overhanging and in close proximity to the edge of said horizontal limb to substantially enclose the space between said horizontal limb and said vernier plate, an annular indicia plate interposed between said horizontal limb and vernier plate carrying a gear ring and bearing conversion tables comprising figures coordinated with the calibrations of said degree scale, a pinion in mesh with said gear ring, and means comprising a knob disposed exteriorly of the space between said vernier plate and horizontal limb operable, in response to manual actuation, to rotate said pinion and indicia plate relative to said vernier plate and horizontal limb and independently of all movement of the telescope, whereby the indicia plate and telescope may be adjusted sequentially, said vernier plate being formed with an opening through which the tables carried by said indicia plate may be viewed.

5. In a transit comprising a vertically adjustable telescope, an inner center, an outer center encircling said inner center, a circular horizontal limb carried by said outer center, a vernier plate carried by said inner center above said horizontal limb, the upper marginal edge of said horizontal limb bearing a degree scale, a vernier suspended from said vernier plate in the plane of and in close proximity to said degree scale for reading the latter, a peripheral rim depending from said vernier plate overhanging and in close proximity to the edge of said horizontal limb to substantially enclose the space between said horizontal limb and said vernier plate, an annular indicia plate interposed between said horizontal limb and vernier plate carrying a gear ring and bearing on its upper surface conversion tables comprising figures coordinated with the calibrations of said degree scale, a pinion in mesh with said gear ring, means comprising a knob disposed exteriorly of the space between said vernier plate and horizontal limb operable, in response to manual actuation, to rotate said pinion and indicia plate relative to said vernier plate and horizontal limb and independently of all movement of the telescope whereby the plate and telescope may be adjusted sequentially, and a pair of view openings in said vernier plate in registry with the arcs of movement of said degree scale and said conversion tables to enable the reading of said scale and tables from above said vernier plate.

EZRA LEO CALLAHAN.

REFERENCES CITED

The following references are of record in the file of this patent:

UNITED STATES PATENTS

| Number | Name | Date |
|---|---|---|
| 55,396 | Trowbridge | June 5, 1866 |
| 373,627 | Wickham et al. | Nov. 22, 1887 |
| 600,084 | Lewis | Mar. 1, 1898 |
| 922,465 | Fenn | May 25, 1909 |
| 983,272 | Erdman | Feb. 7, 1911 |
| 1,000,282 | Moller | Aug. 8, 1911 |
| 1,116,452 | Lorraine | Nov. 10, 1914 |
| 1,958,512 | Egy et al. | May 15, 1934 |
| 2,164,051 | Brunson | June 27, 1939 |
| 2,439,209 | Halsey | Apr. 6, 1948 |